United States Patent [19]

Dicks et al.

[11] 4,012,190
[45] Mar. 15, 1977

[54] ANNEALING LEHR

[75] Inventors: Charles E. Dicks, Uniontown; Clifford O. Burton, Perryopolis, both of Pa.

[73] Assignee: E. W. Bowman Incorporated, Uniontown, Pa.

[22] Filed: Sept. 15, 1975

[21] Appl. No.: 613,203

[52] U.S. Cl. .................................. 432; 13/2 R; 432/48; 432/146

[51] Int. Cl.² ...................................... F27B 9/00

[58] Field of Search ............. 432/48, 82, 143, 144, 432/145, 146; 13/2

[56] References Cited

UNITED STATES PATENTS

| | | | |
|---|---|---|---|
| 1,752,158 | 3/1930 | Engels | 432/146 |
| 1,870,262 | 8/1932 | Morton | 432/143 |
| 2,458,040 | 1/1949 | Weller | 432/145 |
| 3,108,351 | 10/1963 | Hermans | 432/48 |
| 3,261,596 | 7/1966 | Bowman | 432/48 |
| 3,314,666 | 4/1967 | Gajardo | 432/82 |
| 3,463,465 | 8/1969 | Fuller | 432/48 |

*Primary Examiner*—John J. Camby
*Attorney, Agent, or Firm*—Beall & Jeffery

[57] ABSTRACT

An annealing lehr comprised of a plurality of serially arranged heating and cooling sections which form a continuous treating chamber through which the ware passes during the annealing operation. An endless foraminous conveyor belt moves through the treating chamber and supports the ware to be annealed, with both the charging and return flights of the belt being located within the heating section to pre-heat the return flight. At least one burner is mounted adjacent the top and at each side of each heating section, and the burners fire directly into a duct which communicates with the inlet of a fan positioned centrally above the treating chamber. The circulating system includes down ducts at each side of the treating chamber and electrical heating elements can be located in the down ducts for providing the necessary heating, in lieu of the gas burners.

16 Claims, 7 Drawing Figures

ANNEALING LEHR

BACKGROUND OF THE INVENTION

The present invention relates as indicated to annealing lehrs of the type in which glassware or other articles formed of glass are passed continuously through the lehr on an endless belt for annealing the ware. In the lehr, the ware is heated above the annealing temperature of the ware and gradually reduced in temperature during subsequent travel through the lehr.

Annealing lehrs of the type here concerned typically comprise a series of heating sections followed by a series of cooling sections for initially heating and subsequently cooling the ware below the strain point of the ware and to a temperature to permit handling of the ware as it is discharged from the lehr. Each heating and cooling section is independently controlled as to temperature, with this feature being disclosed in U.S. Pat. No. 3,261,596, granted July 19, 1966 to Edward W. Bowman. The present invention constitutes an improvement of the lehr disclosed in such patent and contains several advantageous features when compared therewith.

SUMMARY OF THE INVENTION

With the availability and consumption of fuel, for example natural gas, becoming a continuing problem, the design of annealing lehrs of the type here concerned has been directed towad ways in which fuel economy could be realized. In accordance with the present invention, a single gas burner is positioned at the side of each lehr section in lieu of a number of smaller gas burners positioned relatively adjacent the bottom of the lehr section as shown in the aforementioned Bowman patent. The provision of a single burner has several advantages in addition to decreased fuel consumption, including the need for substantially fewer pilot burners and scanning devices which are frequently used for flame detection.

The invention is further characterized by the novel manner in which the flame from the gas burner is directed into the circulating system. The burner flame is diverted and confined to a duct the inner end of which communicates directly with the fan inlet, with the hot gases being circulated, along with the treating gases which have passed over the ware, through down ducts at either side of the lehr. Because of the improved efficiency of flame direction and circulation, sufficient heat is normally obtained with the provision of only one gas burner at each side of the lehr, although for relative longer lehr sections, additional burners may be required.

A still further feature of the invention is the provision of electrical heating means in combination with or in lieu of the gas burner means normally supplied with the lehr. Where natural gas is in short supply or totally unavailable, the system can be readily converted to to electrical heat, and the electrical heating assemblies can be installed in the sides of the lehr so as to optimize the heat input provided by such assemblies. The lehr is constructed and arranged so that gas or electric heat can be used without requiring modification of the lehr, except for the installation or energization of the electrical heating assemblies, or the addition of gas burners. Substantially no production loss is encountered in the conversion from one source of energy to the other.

Another aspect of the present invention which achieves the desired fuel economy is the provision of an endless conveyor belt which supports the ware and which has a return flight internal of the lehr. It has been common practice in the art to locate the return flight of the lehr conveyor outside the heating or cooling sections and this has resulted in substantial inefficiency inasmuch as the belt must be heated during its travel through the lehr. By locating the return flight of the belt inside the lehr and thus not in contact with ambient temperatures, the belt reaches the charging end of the lehr at a substantially higher temperature whereby the annealing temperature can be reached with reduced fuel consumption. The invention further includes the provision of adjustment mechanism for the return flight so that the return flight can be properly aligned before entering its inaccessible path through the lehr sections to the charging end of the lehr.

These and other objects of the invention will be apparent as the following description proceeds in particular reference to the application drawings.

BRIEF DESCRIPTION OF THE APPLICATION DRAWINGS

DETAILED DESCRIPTION OF THE PREFERRED EMBODIMENTS

Figure 1A:
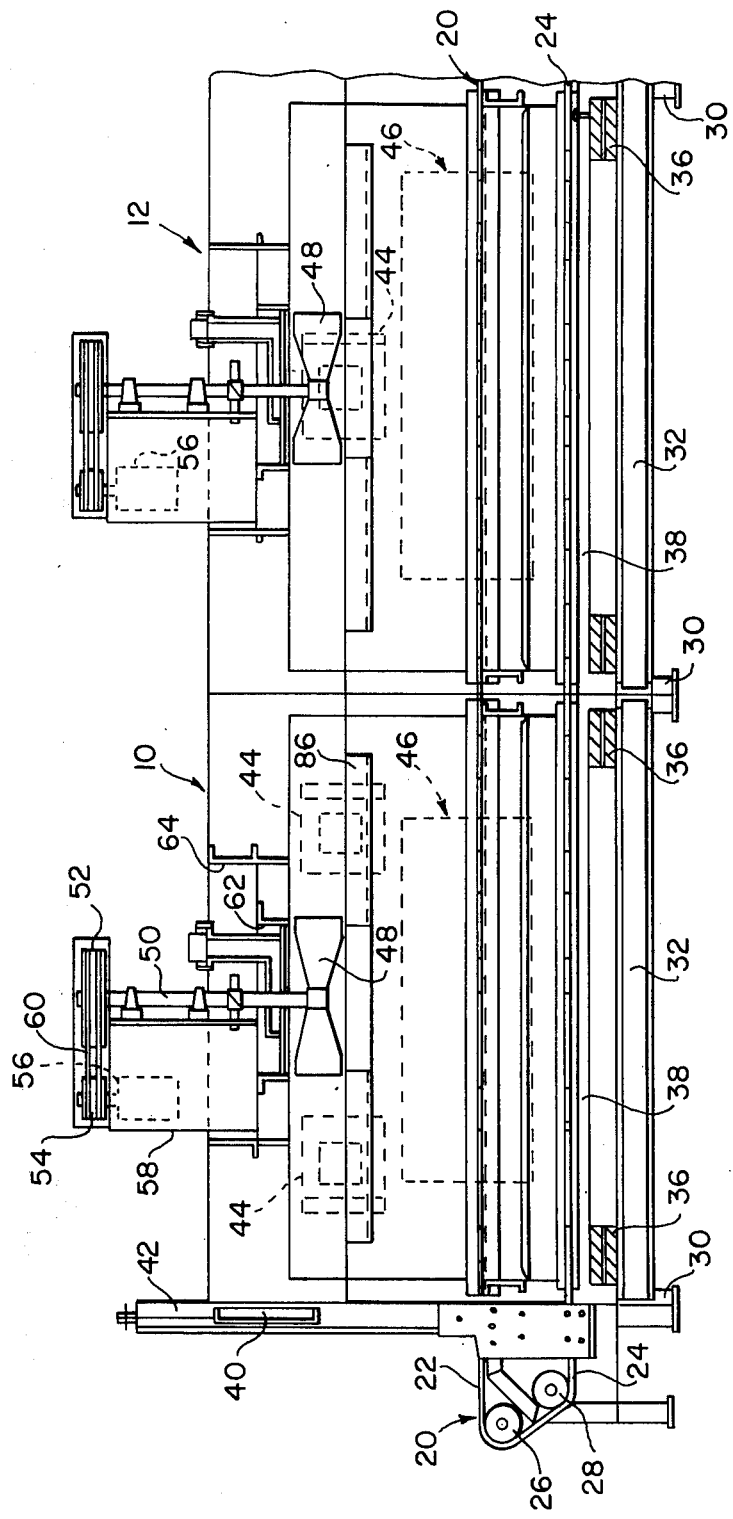
FIG. 1a is a fragmentary side elevational view showing the first two heating zones of the annealing lehr constructed in accordance with the present invention.
Figure 1B:
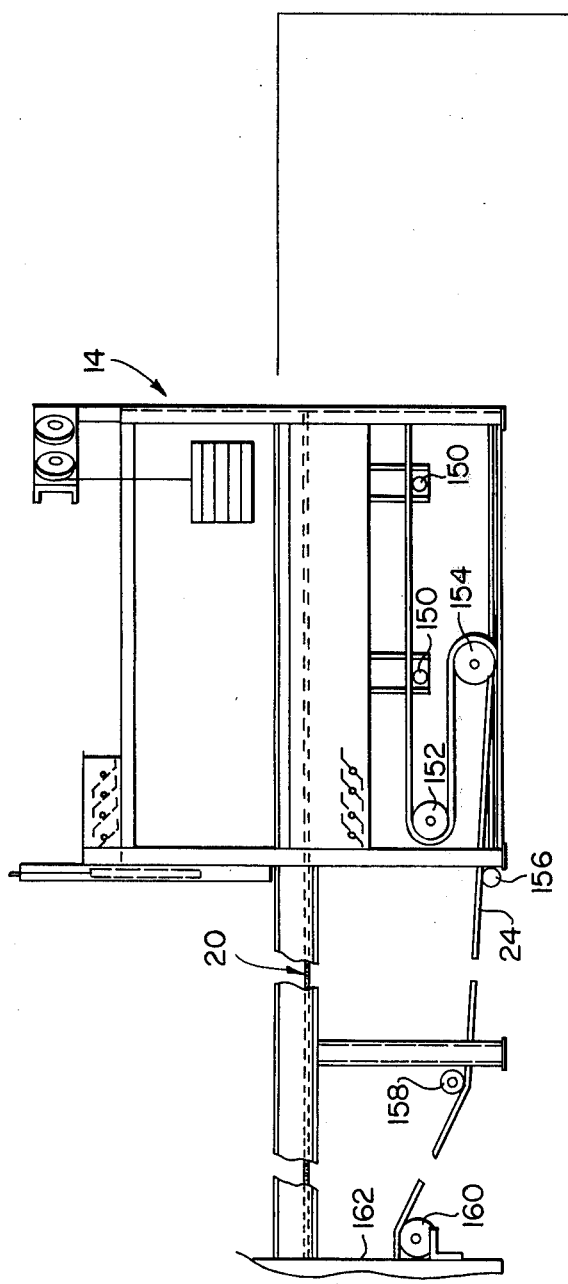
FIG. 1b is a fragmentary side elevational view showing the final two cooling sections of the lehr and the delivery table at the forward end of the lehr.
Figure 1B:
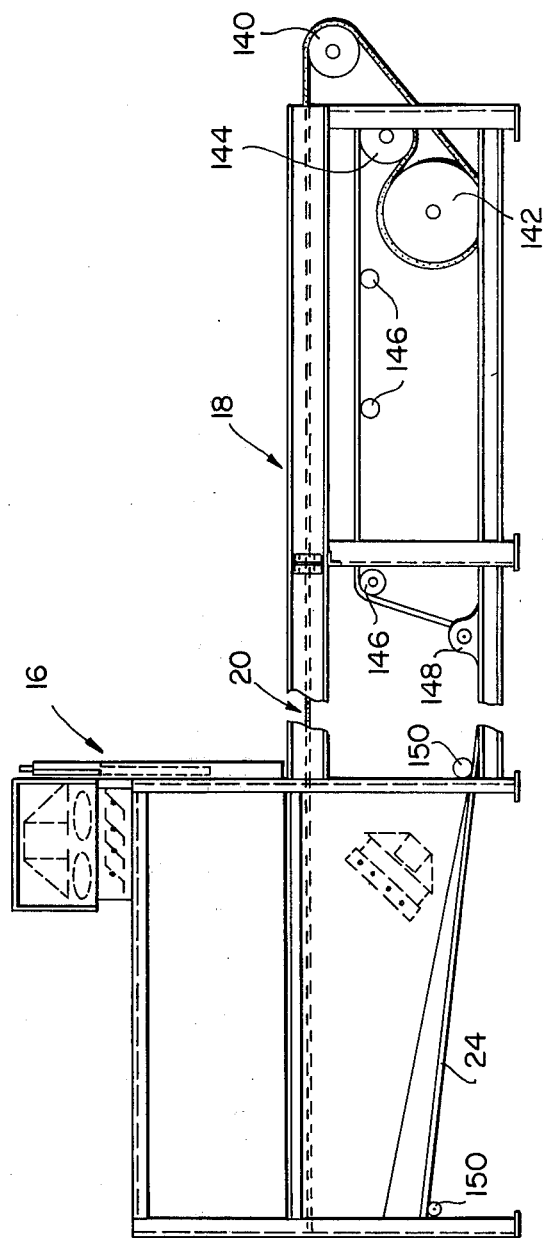

Referring now in more detail to the application drawings, wherein like parts are indicated by like reference numerals, and intially to FIG. 1a and 1b, there is illustrated therein the first two heating sectons, generally indicated at 10 and 12, shown in FIG. 1a, and the last two cooling sections, generally indicated at 14 and 16, FIG. 1b, of annealing lehr constructed in accordance with the present invention. Since subsequent heating zones of the lehr are of similar construction to the lehr section 12, they have not been illustrated in the application drawings, nor have the cooling sections which precede the cooling sections 14 and 16. The manner in which the ware is cooled while passing through the lehr forms no part of the present invention, nor does the details of construction of the delivery table section generally indicated at 18 at the end of the lehr.

Referring to the heating section or zone 10, this constitutes the pre-heating zone of the lehr, with the ware being delivered to the pre-heating zone 10 by means of a continuous lehr belt generally indicated at 20, the upper flight 22 of which moves to the right as shown in FIG. 1a so as to convey ware positioned on the belt into and through the lehr sections. As above noted, an important aspect of the present invention resides in the return flight of the lehr, shown at 24, traveling internally of the lehr on its return to the charging end of the lehr, as will be explained in more detail hereinbelow. The lehr belt 20 travels around charging rolls 26 and 28 mounted in pillow blocks (not shown) at the charging end of the lehr for reversing the direction of the belt.

The supporting frame for the lehr sections is conventional, comprising buckstays commonly designated at 30, longitudinal frame members commonly designated at 32 and vertical buckstays 34 (FIG. 2) which are arranged and interconnected so as to form a rigid supporting structure for each lehr section. Extending transversely of the lehr sections 10 and 12 above the frame members 32 are fire-brick piers 36 which serve to support refractory slab sections 38 which form the bottom wall of each lehr section. Although not shown in the application drawings, it will be understood that refractory insulation is mounted as necessary on all wall surfaces of the heating sections so as to permit attainment of the desired annealing temperatures within the heating sections.

A vertically movable charging door 40 is mounted adjacent the front buckstays 30 for minimizing drafts at the charging end of the lehr. As well understood by those in the art, the charging door 40, which is supported by a cable 42, is lowered to a position just above the ware positioned on the belt 20 so as to minimize the influx of air at the charging end.

The function of the pre-heating section 10 is to rapidly raise the temperature of the ware entering the lehr, with the ware being at a normally reduced temperature as compared to the glass forming temperature due to the required transport of the ware from the forming machine to the annealing lehr. To effectively raise the temperature of the ware in the pre-heating zone 10, two gas burners shown in dash lines and commonly designated at 44 are mounted at each side of the pre-heating zone. The provision of two burners rather than a single burner as in the subsequent heating zone permits the increase in temperature desired prior to the ware passing subsequently through the serially arranged heating zones, only one of which has been shown in FIG. 1a.

An electrical heating element is shown in dash lines and generally indicated at 46 can be optionally mounted in each side wall of the lehr to augment or entirely replace the heat derived from the gas burners 44. As above noted, an important part of the present invention is the provision of both gas and electric heating means in order to permit alternate operation of the lehr with the most economical or available fuel source. Positioned centrally at the top of each lehr section is a fan 48 the shaft 50 of which is driven by a pulley 52 which is in turn driven by a pulley 54 directly driven by a motor 56 mounted on a motor frame 58 positioned on top of the lehr section. Drive belts 60 interconnect the pulleys 52 and 54 for operating the shaft 50 of the fan 48.

A fan housing 62 is mounted in the top of the lehr for receiving the fan, and a supporting frame 64 is likewise mounted on top of the lehr for receiving and supporting the fan motor and drive components. The fan mounting and drive components therefor are well known in the art and form no part of the present invention. A sliding brick assembly 65 is provided for manually admitting air to the treating chamber.

The lehr section 12 which constitutes zone 2 of the lehr is similar in construction to the pre-heating zone 10 except that only one gas burner 44 is mounted on each side of the lehr zone, generally centrally as shown in FIG. 1a. The heating requirements in zone 2 are not as severe as the heat output required in the pre-heating zone 10, since the latter is required to raise the temperature of the ware entering the lehr as quickly as possible to the annealing temperature of the ware, which is achieved in subsequent heating sections. An electrical heating assembly 46 is shown in dash lines in the heating zone 2 to provide optional gas or electric heat for the lehr section, with the details of the electrical heating assembly being described in more detail when reference is made to FIG. 2. All components of the lehr section 12 which have been previously described with reference to the pre-heating zone 10 have been identified by the same reference numerals.

Although only pre-heating section 10 and a heating section 12 have been shown in FIG. 1a, it will be understood that additional heating sections will be provided to permit the ware to reach and surpass the annealing temperature within a time interval as determined by the speed of the lehr conveyor 20 passing through the lehr sections. For example, four additional lehr sections constructed similar to the section 12 may be provided after which the annealed ware is passed through cooling sections for controlled cooling of the ware prior to reaching the discharge end of the lehr. FIG. 1b illustrates only cooling sections 14 and 16 which constitute fast cooling sections for quickly reducing the temperature of the ware prior to reaching the delivery table 18 at which the ware is at a sufficiently low temperature to permit handling thereof. Additional cooling sections precede the fast cooling section 14 and 16, and these additional cooling sections can be constructed in the same general manner as the heating section 12 except that no heating means is provided in these sections. In addition, the cooling sections are normally provided with dampered exhaust outlets for exhausting the gas from the treating chamber as desired. Although not shown in the heating section 12, it will be understood that similar dampered exhaust duct means may be provided in certain of the subsequent heating sections as necessary or desirable to provide the desired temperature within each such section. Although not shown in the application drawings, the temperature in each heating and cooling zone is separately controlled by conventional heat responsive devices such as themocouples positioned in the respective curve to be achieved in the serially arranged lehr sections to provide optimum annealing of the ware passing through the lehr.

Figure 2:
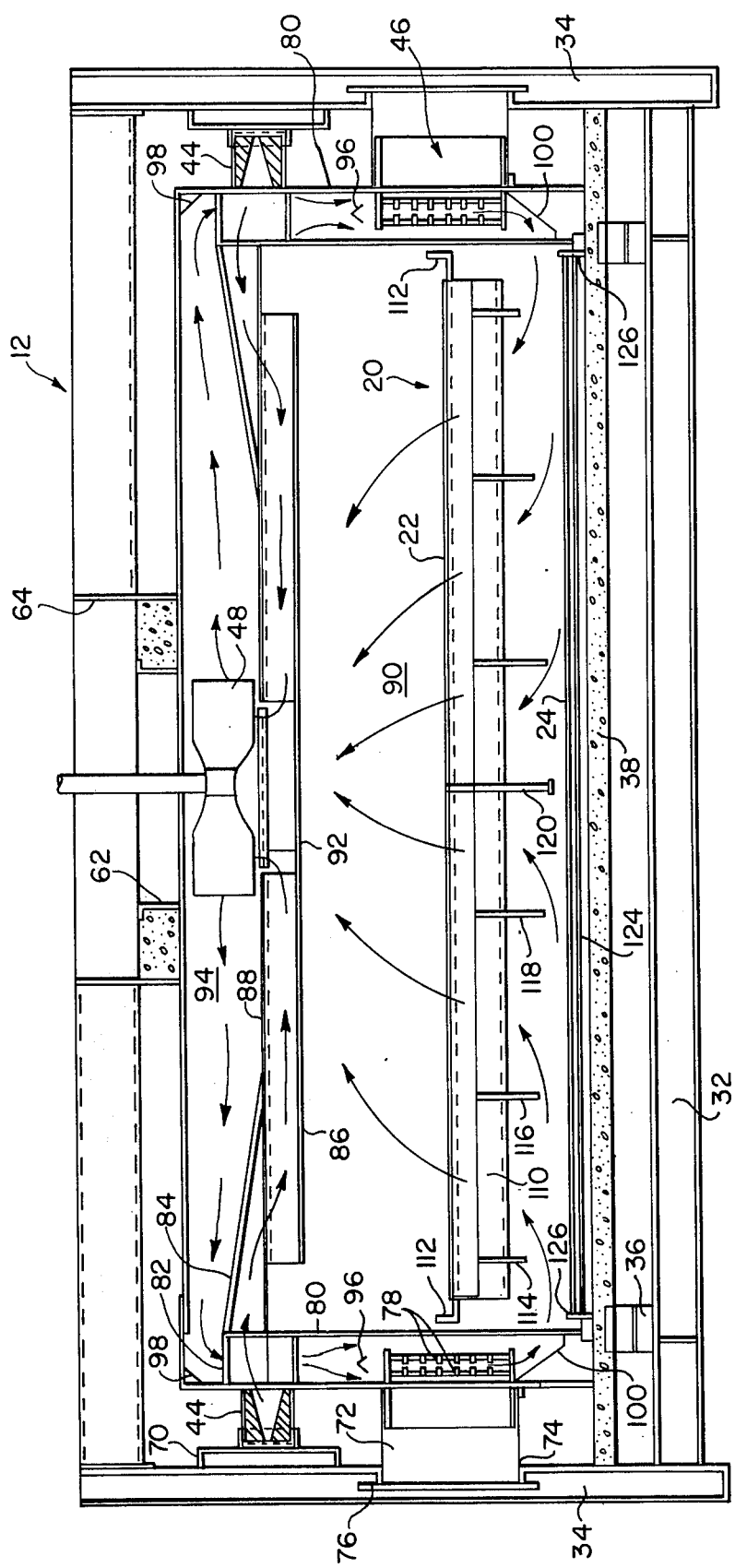
FIG. 2 is a vertical, transverse section taken through the second heating zone of the annealing lehr.

Referring now to FIG. 2, which comprises a vertical transverse cross section through the heating zone 12, the burner 44 is carried by a burner housing 70 mounted in the side wall of the lehr, and the electrical heating assembly 46 is carried by a bung 72 likewise mounted in the side wall of the lehr, with the bung extending through an opening 74 provided therefor in the side wall of the lehr section. The bung includes a peripheral flange 76 which engages the flange opening 74 to properly position the bung and thus the electrical heating assembly 46 in the lehr section. The electrical heating assembly 46 includes individual resistance elements commonly designated at 78 which are positioned in the down duct 80, with the positioning of the element 78 in the duct being relatively important as will be explained hereinbelow.

As noted in the introductory part of the present specification, an important feature of the present invention resides in the use of a single gas burner at each side of the lehr, where gas is used as the sole source of fuel or used in combination with the electrical heating assembly 46, and the gas flame is directed as shown by arrows in FIG. 2 through a flame shield 82 mounted in the down duct 80 and surrounding the burner 44 and the enclosure therefor, with a flame deflector 84 being mounted adjacent the flame shield and being directed inwardly thereof for directing the flame through a duct 86 which is mounted on the top wall 88 of the treating chamber of the lehr, which is indicated by reference numeral 90. The duct 86 and the top wall 88 are open in the area below the flame deflector 84 to permit entry of the flame into the duct for passage through central opening 92 formed in the top wall for communicating the treating chamber 90 and the duct 86 with the fan inlet. The ducts 86 terminate adjacent the opening 92 and are opened at their inner ends for directing the flame by the fan 48 to the upper circulating chamber 94. As shown in FIG. 1a, the ducts 86 extend substantially the entire length of the heating zone, the length being referred to as the left to right dimension in FIG. 1a, so as to evenly distribute the flame along the duct prior to entry into the circulating chamber 94.

The circulation system for the heating zone 10 is shown by arrows in FIG. 2 and it will be noted that the hot gases are directed through the circulating chamber 94 to the down duct 80 at each side of the lehr, with the gases passing around the flame shield 82 downwardly past a deflector bar 96 and over the resistance elements 78, which are normally not energized when the gas burners are firing. A baffle 98 is positioned at the juncture of the circulating duct 94 and the down duct 80, and a somewhat larger baffle plate 100 is positioned in the down duct 80 below the resistance elements 78 for more efficiently directing the hot gases to the area below the lehr conveyor. The gases thereafter pass upwardly through the foraminous conveyor belt 20 thereby heating the ware being conveyed on the belt. After passing over the ware, the gases are drawn into the fan inlet for mixing wih the hot burner gases emanating from the burners 44 as above described.

The upper or charge flight 22 of the belt is supported by a charge skid frame 110 which is supported from both sides of the lehr, with the skid frame being provided with laterally outwardly and upwardly directed side flanges 112 which provide outer limits for transverse movement of the upper flight 22 of the belt. Mounted on the skid frame and extending downwardly therefrom are baffle plates 114, 116 and 118 which function to deflect the air emanating from the bottom of the down ducts 80 upwardly through the foraminous belt and the ware supported on the belt. It will be seen that the baffle plates 114-118 vary in vertical dimension, being progressively longer toward the center of the treating chamber, and such arrangement functions to provide uniform flow of the hot gases over the width of the lehr belt thereby preventing stratification of the hot gases. A center deflector plate 120 prevents significant exchange of the hot gases from one side of the treating chamber to the other, with the bottom of the center deflecting plate 20 terminating just above the return flight 24 of the conveyor belt. The mounting of the baffle plates 114 – 120 is novel and permits the hot gases to be uniformly distributed upwardly through the belt and ware without interfering with the internal belt return, which is also an important part of the present invention.

The return flight 24 of the belt is mounted on a return skid frame 124 which is mounted on the refractory section 38 which forms the bottom wall of the lehr, with the return skid frame being formed with longitudinally extending side flanges 126 which serve to limit the transverse movement of the return flight 24 of the belt in either direction. The position of the side flanges 126 can be adjusted as will be explained in more detail hereinbelow when particular reference is made to FIGS. 3 and 4 of the application drawings.

As above noted, normally only one burner 44 is provided at each side of the lehr in all of the heating sections except for the pre-heating section 10. The desired temperature curves can be achieved in each heating section by virtue of the single burner firing directly into the duct 86 the inner end of which communicates directly with the fan inlet. The circulation of the hot gases, along with the gases in the treating chamber 90 which have passed over the ware carried by the belt 20, more efficiently achieves the desired heating effect when contrasted with gas burners mounted adjacent the bottom of the down duct as illustrated in U.S. Pat. No. 3,261,596, referred to above. It has been found that a single gas burner mounted at each side of the lehr when located and fired as shown in FIG. 2 provides the necessary heat input for the normal lehr section, which typically is eight feet long. The location and direct firing of the burner also provides the advantage that no air is introduced into the heating chamber except hot burner gases at a predetermined temperature, and no undesirable heat radiation occurs.

The provision of a single gas burner at each side of the lehr section as in most instances achieves the further advantage of reducing the inefficiency inherent when several gas burners are required at each side of the lehr. As well known by those in the art, gas burners are approximately 70% efficient, and substantial inefficiency thus results particularly at low firing conditions since the fuel requirements at low fire for a relatively large burner such as burner 44 is essentially the same as for a small burner. Not only is the fuel requirements substantially reduced at low fire conditions, the provision of safety equipment for the lehr is much less costly since fewer flame scanning devices are required. Flame scanners are normally provided and are required in some jurisdictions, and it is relatively difficult and expensive to provide scanning equipment which can effectively scan all of the several burners used in typical prior art annealing lehrs, in view of the requirement that the scanning equipment pick up the burner flame at low firing conditions. A still further advantage is the economy realized through the substantial reduction in the number of pilots used for the lehr due to the reduced number of burners. In a typical annealing lehr of 72 feet in length having five heating sections, only ten pilots are now required as contrasted with as many as 40 pilots being required where several, relatively smaller burners were mounted adjacent the lower end of each lehr section. Pilot frames are necessary but wasteful and the heat produced by the pilot flames at low fire particularly produce excess heat which necessitated the presence of cooling air to reduce such heat.

The location of each burner in the heating zones is quite critical if optimum heating in each section is to be achieved. The improved circulation in accordance with the present invention is achieved by virtue of the direct firing of the burners into the ducts 86, and relatively close tolerances, for example 1 in., must be adhered to to provide the desired results.

As above described, the electrical heating assemblies 46 can be provided in lieu of the gas burners 44 depending upon fuel availabilty and cost. Where the electrical heating assemblies are employed, it is relatively important that the assemblies be mounted so that the resistance elements 78 are precisely positioned in the down duct 80. Moreover, the supporting bung which carries the resistance elements must be positioned in the opening therefor in the side wall of the lehr so as to provide a surface which is continuous relative to the surface of the down duct 80 above and below the installation. Moreover, the resistance elements must be vertically positioned in the down duct so as to avoid the creation of hot spots due to radiation and permit uniform air flow over the elements. The provision of baffles 96 in FIG. 2 enhances the uniformity of the air flow over the elements. The vertical positioning of the resistance elements in the down duct will vary from lehr to lehr to some extent depending upon the use of the lehr. The maximum heat input of the resistance elements is limited by the vertical dimension of the down duct 80 and the size of the resistance elements. In a typical 8 foot lehr section, the resistance elements are approximately 56 in. in length and 13.5 in. in height, with a typical heat input being 3 KW per longitudinal foot of resistance elements.

As shown in FIG. 2, two banks of resistance elements 78 are illustrated, and the spacing of such blanks from each other and from the sides of the down duct is important. A spacing of at least 2 in. between the element banks permits air flow between the elements, and a space of at least one half inch is necessary between each bank and the adjacent wall of the down duct to permit air flow on either side of the elements. Minimum air flow past the elements is required to prevent the elements from burning out. In certain installations, the heat input required may permit a single bank of elements to be used or require more than two banks to obtain the necessary heat. Where more than two banks are employed, the above noted spacing requirements still apply.

An important feature of the present invention resides in the internal belt return of the endless belt 20. The purpose of such internal belt return is to minimize heat loss in the belt during its return to the charging end of the lehr, and in this regard it should be noted that up to approximately 40% of the total heat requirements in the annealing lehr are absorbed by the endless belt which is normally of wire mesh material. The reduction of such heat loss will obviously result in substantial fuel savings in the operation of the lehr.

As well known by those in the art, the endless belt must be maintained in general alignment while supporting the ware during the annealing operation, and such alignment was not a substantial problem where the belt return was outside the lehr since any misalignment of the belt during the return flight could be taken care of without difficulty. However, where the belt return is internal, provision must be made for aligning the belt during the return flight since the belt is not accessible for external adjustment in those regions where the return flight is within the heating zones. In accordance with the present invention, adjusting means are provided for the return flight of the belt just prior to passage of the belt into the rearmost cooling zone.

Referring to FIG. 1b, the path of the belt 20 through the cooling sections 14 and 16 and to and from the delivery table 18 is illustrated. After passing through the cooling sections 14 and 16 and beneath the delivery table 18, the endless belt passes over a top discharge roll 140 mounted in pillow blocks at the front of the lehr. The belt thereafter passes around a drive roll 142, which can be driven in a well known manner (not shown), a snub roll 144, return rolls commonly designated at 146 and a return roll at the bottom of the supporting frame mounted in pillow block 148. The belt thereafter passes over additional return rolls commonly designated at 150 and around a fixed take-up roll 152. The belt then passes around an adjustable take-up roll 154, over return roll 156 and under and over, respectively, a slot roll 158 and a return charge roll 160. The last two mentioned rolls are shown only schematically in FIG. 1b and are adjustable as will be presently described to permit proper alignment of the return flight of the belt before passing through the cooling sections of the lehr, with the rearmost cooling section being shown fragmentarily at 162 in FIG. 1b.

Figure 5:
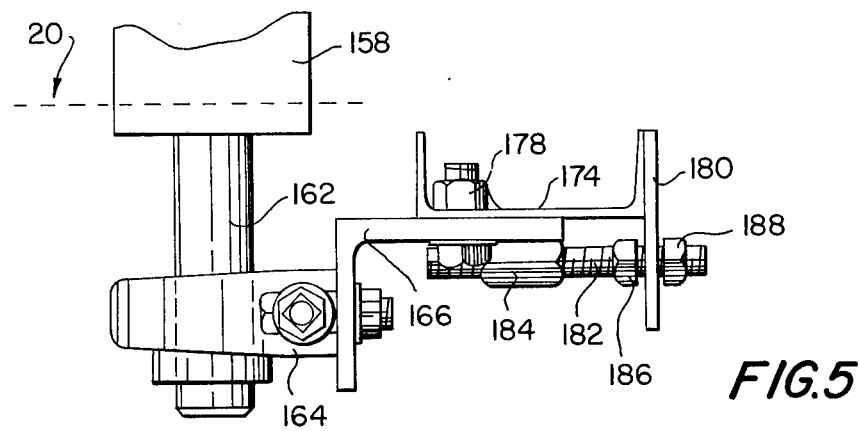
FIG. 5 is a fragmentary, top plan view of the roller adjustment mechanism for the return flight.
Figure 6:
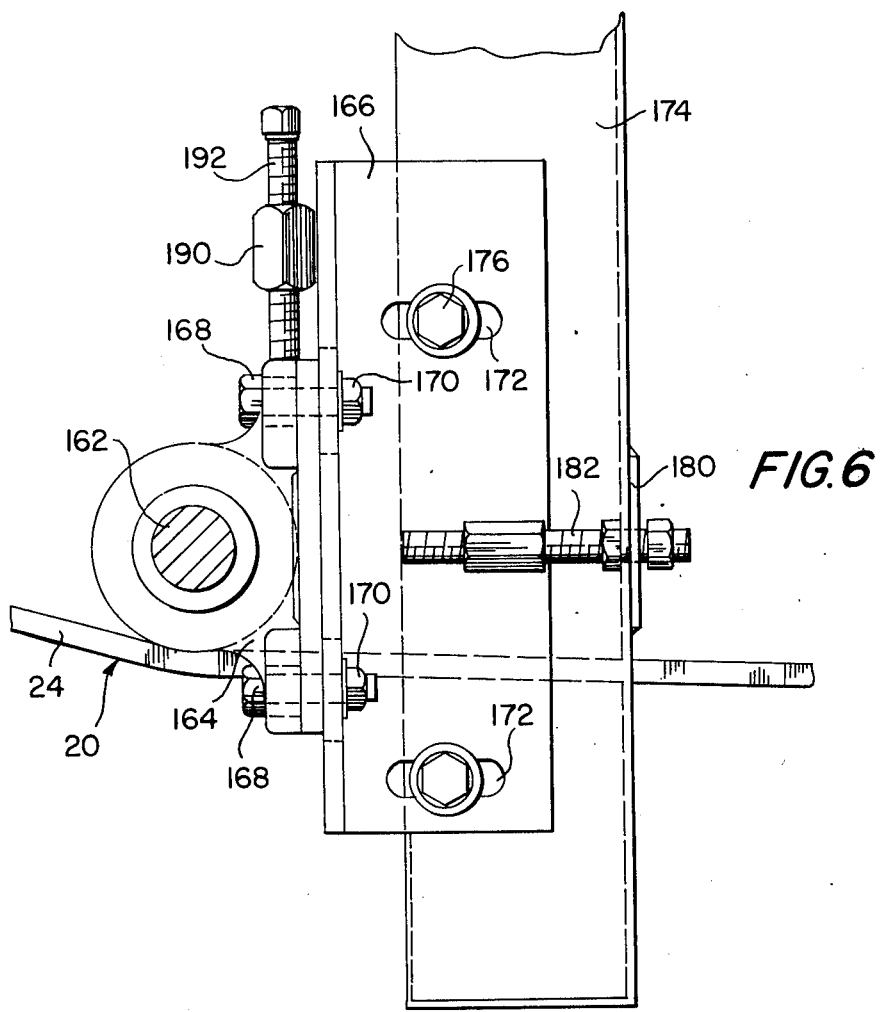
FIG. 6 is a fragmentary side elevational view of the adjustment mechanism of FIG. 5.

The adjustment for the slot roll 158 is shown in FIGS. 5 and 6. The shaft 162 of the roll 158 is mounted in pillow blocks 164 positioned at each side of the lehr with the blocks in turn being mounted on a generally L-shaped bracket 166 by means of bolts 168 and nuts 170. The bracket 166 is provided with vertically spaced slots commonly designated at 172 for adjustably mounting thereon a generally U-shaped bracket 174, with nut and bolt assemblies 176 extending through the slots 172 and through openings therefor in the flange 174 for making the necessary connection. The nut 178 is welded to the flange 174 as shown in FIG. 5.

The flange 174 is secured to a fixed frame member 180 which is in turn fixed to a buckstay (not shown).

A threaded rod 182 extends through a threaded opening formed in the plate 180 and the rod carries a sleeve nut 184 which is secured by welding to the flange 166. A nut 186 is welded to the rod 182 whereby rotation of the rod 182 through the nut 186 functions to move the sleeve nut 184 along the threaded rod, depending upon the direction of rotation thereof. Due to the provision of the slots 172, the bracket 166 can therefore be moved longitudinally, or from right to left as viewed in FIG. 5 and 6, thereby to move the pillow blocks 164 and the slot roll 158 mounted therein. A lock nut 188 serves to lock the rod 182 in its adjusted position.

The roller 158 can be vertically moved in a similar manner. A sleeve nut 190 is secured, for example, by welding to the bracket 166 and an adjusting bolt 192 is threaded through the sleeve nut for engagement with the top surface of the pillow block 164. Although not shown in FIGS. 5 and 6, the pillow block is formed with slots through which the bolts 168 extend to permit vertical sliding movement of the pillow block relative to the flange 166 when the adjusting bolt 192 is rotated. In this manner, the pillow blocks 164 and thus the slot roll 158 can be vertically adjusted as desired to maintain the proper orientation of the return flight of the belt, with the edge of the belt 20 being shown by a dash line in FIG. 5.

Although the adjusting means just described is positioned at one side of the slot roll 158, it will be understood that similar adjusting mechanism is provided at the opposite side of the lehr. The mechanisms are independently adjustable whereby the entire length of the rolls can be moved upwardly or downwardly or longitudinally, or one side of the roll can be adjusted relative to the other. For example, if the slot roll is not perfectly horizontal there will be a tendency for the return flight of the belt to slide toward the lower end of the roll, and such lower end can be raised through rotation of the adjusting bolt 192 and subsequently locked in position by tightening of the bolts 168. In the same manner, if the roll 158 does not extend precisely perpendicular to the path of travel of the belt, misalignment occurs and adjustment by means of the threaded rod 182 and the sleeve nut 184 permits one end of the roll to be adjusted longitudinally relative to the other end thereby to bring the roll back into an orientation perpendicular to the path of belt travel. The adjustment mechanism for the return charge roll 160 is generally the same as that just described with reference to the slot roll 158 and permits final adjustments of the belt just prior to entering the lehr during the return flight of the belt. Through proper adjustment of the slot roll 158 and return charge roll 160, the belt can be maintained in proper alignment during its return travel through the lehr.

Figure 4:
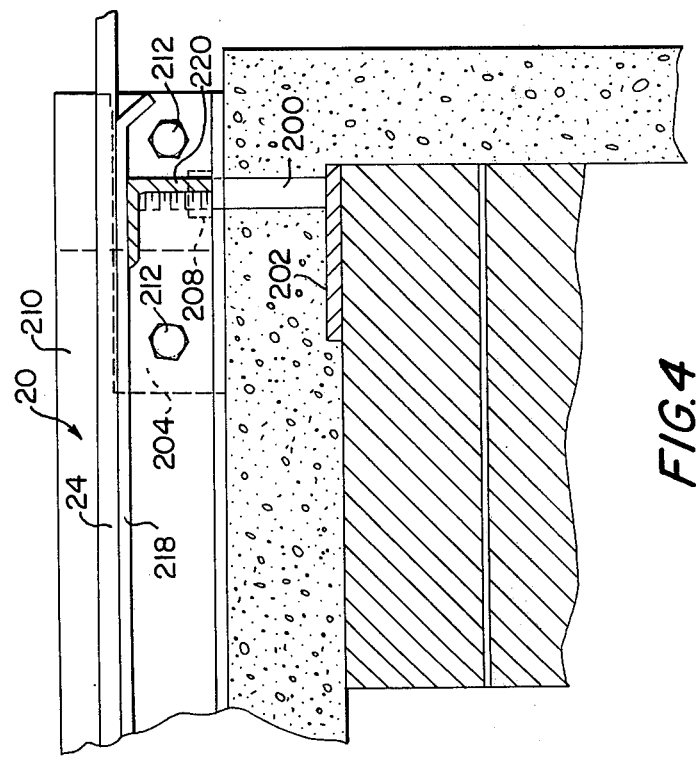
FIG. 4 is also an enlarged fragmentary cross sectional view taken at right angles to FIG. 3.
Figure 3:
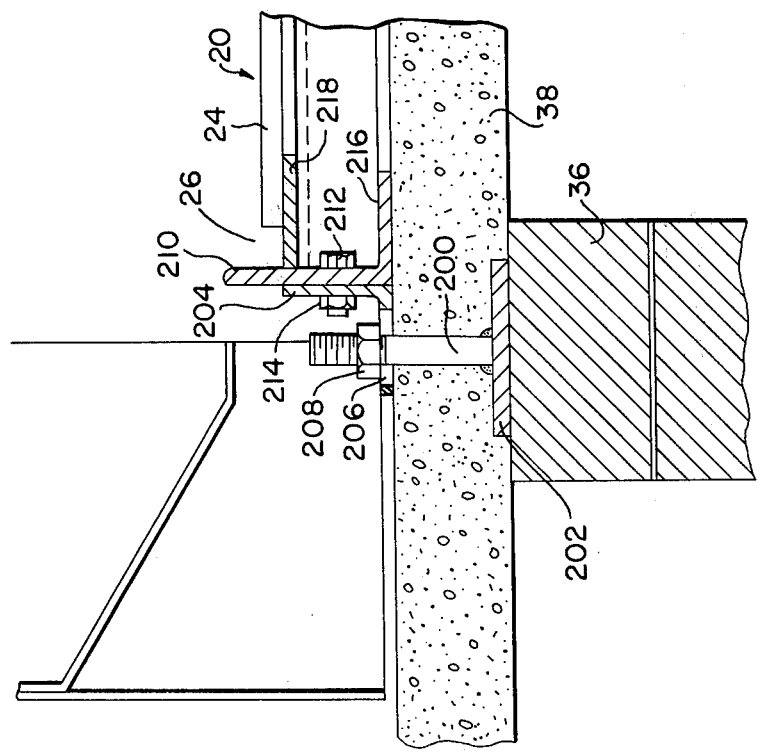
FIG. 3 is an enlarged, fragmentary cross sectional view of a portion of FIG. 2, showing in more detail the means for adjusting the return flight of the lehr belt.

Reference is made to FIGS. 3 and 4 which show in greater detail the manner in which the return flight of the belt 20 is supported internally of the lehr. FIG. 3 is an enlarged, fragmentary view of the return belt support shown in FIG. 2, and FIG. 4 is an end view of FIG. 3, looking from the right end thereof. The refractory base 38 is supported as previously described on support members 36 and a bolt 200 extends through the refractory base 38 and has bolted thereto a base 202. A support angle 204 is positioned on the top of the refractory base 38 and is provided with an elongated slot 206 in the base thereof through which the bolt 200 extends. The top of the bolt is threaded for receiving a nut 208 which can be hand tightened when the flange 204 has been transversely adjusted to its desired position. A second flange 210 which forms part of the return skid frame 26 is also supported on the refractory base and is positioned in contact with the flange 204 as illustrated. A bolt 212 and nut 214 extend through openings formed in the flanges 204 and 210 for securing the same together. A skid bar 218 extends longitudinally of the lehr for supporting the return flight 24 of the endless belt 20. As shown in FIG. 4, the skid bar 218 is supported by support angles 220 welded to the flanges 210 and which extend transversely of the lehr and are spaced on approximately 2 ft. centers to provide the necessary support for the skid bars. The skid bars 218 extend the full length of each lehr section and are preferably on 12 in. centers.

The flange 210 preferably extends the full longitudinal length of the lehr section, as does the flange 204, and an adjusting bolt 200 is provided at both the front and rear and at end side of the lehr section. It will thus be seen that the skid frame can be moved transversely through sliding movement of the flanges 204 and 210 by virtue of the slot 206, with the nut 208 thereafter being provided to clamp the flanges in their adjusted position. This permits proper tracking of the belt, and in the event vertical adjustment is necessry, shims can be provided beneath the flanges 204 and 210 to elevate the flanges at one side or the other to achieve the necessary horizontal condition.

We claim:

1. An annealing lehr comprised of a plurality of heating section serially arranged to form a continuous treating chamber through which the ware passes during the annealing operation; an endless foraminous conveyor belt for supporting the ware to be annealed, and means for supporting both the charging and return flights of said belt within said treating chamber, comprising an upper skid frame for supporting the charging flight of said belt and a lower skid frame positioned adjacent the bottom of said treating chamber for supporting the return flight of said belt; a circulating chamber including a top portion at the top of each treating chamber and a down duct portion at each side of said treating chamber, said down duct terminating below said conveyor belt to permit treating gases to pass upwardly through said belt and over said ware; a circulating fan mounted in the top portion of said circulting chamber and communicating with the top of said treating chamber for recirculating the treating gases which have passed over said ware, and electrical heating means mounted in and spaced from the walls of said down ducts at each side of the lehr generally laterally adjacent the charging flight of said conveyor, said treating gases circulated by said fan passing downwardly through said down ducts, over said electrical heating means and upwardly through said conveyor and over said ware supported thereon.

2. The annealing lehr of claim 1 wherein said means for supporting the return flight of said belt includes means for transversely adjusting the alignment of said return flight so as to permit correct alignment of the return flight of the belt, and means accessible at the exterior of said lehr for providing both vertical and longitudinal adjustment of said return flight prior to entry of the return flight interiorly of the lehr.

3. An annealing lehr comprised of a plurality of heating sections serially arranged to form a continuous treating chamber through which the ware passes during the annealing operation; an endless foraminous conveyor belt constructed and arranged for movement through said treating chamber, said belt supporting the ware to be annealed; at least one burner mounted relatively adjacent the top and at each side of each lehr section; a circulating chamber including a top portion at the top of each treating chamber and a down duct portion at each side of said treating chamber, said down duct terminating below said conveyor belt to permit treating gases to pass upwardly through said belt and over said ware; a circulating fan mounted in the top portion of said circulating chamber and having an inlet communicating with the top of said treating chamber for recirculating the treating gases which have passed over said ware, and duct means positioned below said fan and communicating the hot burner gases substantially directly to the inlet of said fan for circulation with said treating gases through said circulating chamber; each gas burner firing into a burner shield positioned in the down duct; a flame detector mounted adjacent such shield and extending over and communicating with said duct means, said flame deflector deflecting the hot burner gases downwardly into said duct means for conveying the hot burner gases directly to the inlet of said fan.

4. An annealing lehr comprised of a plurality of heating sections serially arranged to form a continuous treating chamber through which the ware passes during the annealing operation; an endless foraminous conveyor belt constructed and arranged for movement through said treating chamber, said belt supporting the ware to be annealed; an upper skid frame for supporting the charging flight of said conveyor, and transversely spaced baffles mounted on and extending downwardly from said upper skid frame into the treating chamber below said frame, said baffles being of staggered height so as to induce uniform flow of the treating gases upwardly through the ware on the conveyor; at least one burner mounted relatively adjacent the top and at each side of each lehr secton; a circulating chamber including a top portion at the top of each treating chamber and a down duct portion at each side of said treating chamber, said down duct terminating below said conveyor belt to permit treating gases to pass upwardly through said belt and over said ware; a circulating fan mounted in the top portion of said circulating chamber and communicating with the top of said treating chamber for recirculating the treating gases which have passed over said ware, and duct means positioned below said fan and communicating the hot burner gasses substantially directly to the inlet of said fan for circulating with said treating gases through said circulating chamber.

5. The annealing lehr of claim 4 wherein said gas burner fires into a burner shield positioned in the down duct which precludes burner gases from flowing directly into the down duct, and a flame deflector mounted adjacent such shield and extending over said duct means, said flame deflector deflecting the hot burner gases downwardly into said duct means which convey the hot burner gases directly to the inlet of said fan.

6. The annealing lehr of claim 4 further including electrical resistance elements positioned in said down duct generally laterally adjacent the charging flight of said conveyor, and baffle means positioned in said down duct above said resistance elements to control the flow of the treating gases downwardly over said elements.

7. The annealing lehr of claim 4 further including means for supporting the return flight of said endless conveyor belt interiorly of the lehr.

8. The annealing lehr of claim 7 wherein said means for supporting said return flight of said conveyor belt includes means for adjusting the alignment of said belt both vertically and longitudinally so as to permit such return flight to be maintained substantially horizontal and substantially parallel to the intended path of travel of the ware through the lehr.

9. The annealing lehr of claim 8 further including a lower skid frame mounted at the bottom of said treating chamber and supporting the return flight of said endless belt, said lower skid frame including means for permitting transverse adjustment of said frame for properly aligning said return flight.

10. An annealing lehr comprised of a plurality of heating sections serially arranged to form a continuous treating chamber through which the ware passes during the annealing operation; an endless foraminous conveyor belt for supporting the ware to be annealed, and means for supporting both the charging and return flights of said belt within said treating chamber; comprising an upper skid frame for supporting the charging flight of said belt and a lower skid frame positioned adjacent the bottom of said treating chamber for supporting the return flight of said belt; said upper skid frame being provided with transversely spaced baffles on the bottom thereof which extend downwardly into the portion of the treating chamber below said charging flight of said belt, said baffles being of varying height so as to provide uniform flow of said treating gases upwardly over the entire transverse dimension of said belt; a circulating chamber including a top portion at the top of each treating chamber and a down duct portion at each side of said treating chamber, said down duct terminating below said conveyor belt to permit treating gases to pass upwardly through said belt and over said ware; a circulating fan mounted in the top portion of said circulating chamber and communicating with the top of said treating chamber for recirculating the treating gases which have passed over said ware, and electrical heating means mounted in said down ducts at each side of the lehr generally laterally adjacent the charging flight of said conveyor, said treating gases circulated by said fan passing downwardly through said down ducts, over said electrical heating means and upwardly through said conveyor and over said ware supported thereon.

11. The annealing lehr of claim 10 wherein said electrical heating means comprises a bung mounted in an opening provided therefor in each side of the lehr and at least one bank of electric resistance elements positioned in each down duct in spaced relation from the side walls thereof.

12. The annealing lehr of claim 11 wherein two banks of electric resistance elements are provided, said banks being spaced from each other and from the side walls of the down duct, and baffle means positioned in said down ducts above said electrical resistance elements for controlling the flow of treating gases uniformly over said resistance elements.

13. The annealing lehr of claim 10 wherein said means for supporting the return flight of said belt includes means for transversely adjusting the alignment of said return flight so as to permit correct alignment of the return flight of the belt.

14. The annealing lehr of claim 10 wherein said means for supporting the return flight of said belt includes means accessible at the exterior of said lehr for providing both vertical and longitudinal adjustment of said return flight prior to entry of the return flight interiorly of the lehr.

15. The annealing lehr of claim 14 wherein said adjustment means comprises a slot roll and a return charge roll over which the return flight passes before entering the lehr, said slot and said return charge rolls being mounted to permit vertical and longitudinal adjustment of one or both ends of said rolls so as to permit precise positioning of said rolls for proper tracking of said return flight through said lehr.

16. The annealing lehr of claim 15 wherein said slot and return charge rolls are mounted at each end in pillow blocks which are independently vertically adjustable on supporting brackets for said pillow blocks thereby to permit vertical adjustment of said rolls, and wherein said support brackets are in turn mounted for longitudinal adjustment on fixed frame members whereby either both ends of said rolls can be adjusted longitudinally.

* * * * *